(12) United States Patent
Mori et al.

(10) Patent No.: US 10,245,943 B2
(45) Date of Patent: Apr. 2, 2019

(54) FILLER LID STRUCTURE

(71) Applicant: TOYODA GOSEI CO., LTD., Kiyosu-shi, Aichi-ken (JP)

(72) Inventors: Naoki Mori, Kiyosu (JP); Masahiro Ogata, Kiyosu (JP); Kouji Kawamoto, Nagoya (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 0 days.

(21) Appl. No.: 15/607,886

(22) Filed: May 30, 2017

(65) Prior Publication Data
US 2017/0368928 A1    Dec. 28, 2017

(30) Foreign Application Priority Data
Jun. 22, 2016    (JP) .................................. 2016-123262

(51) Int. Cl.
*B60K 15/05*    (2006.01)
*B60K 15/04*    (2006.01)

(52) U.S. Cl.
CPC .............. *B60K 15/05* (2013.01); *B60K 15/04* (2013.01); *B60K 2015/053* (2013.01); *B60K 2015/0523* (2013.01); *B60K 2015/0561* (2013.01); *B60K 2015/0576* (2013.01)

(58) Field of Classification Search
CPC ... B60K 15/05; B60K 15/053; B60K 15/0546
USPC ..................................................... 296/97.22
See application file for complete search history.

(56) References Cited

U.S. PATENT DOCUMENTS

| | | | | |
|---|---|---|---|---|
| 5,658,036 A | * | 8/1997 | Benoist | B60K 15/05 220/86.2 |
| 8,439,421 B2 | * | 5/2013 | Mihai | B60K 15/05 220/86.2 |
| 8,528,959 B2 | * | 9/2013 | Baba | E05F 5/022 296/97.22 |
| 8,740,283 B2 | * | 6/2014 | Yamamaru | B60L 11/1818 296/136.01 |
| 8,933,332 B2 | * | 1/2015 | Yamamaru | B60L 11/1818 174/67 |
| 9,656,561 B2 | * | 5/2017 | Yoo | B60L 11/1818 |
| 9,688,137 B2 | * | 6/2017 | Takahashi | B60L 11/1818 |

(Continued)

FOREIGN PATENT DOCUMENTS

| | | |
|---|---|---|
| JP | 2005-343367 A | 12/2005 |
| JP | 2013-001384 A | 1/2013 |

*Primary Examiner* — Dennis H Pedder
(74) *Attorney, Agent, or Firm* — Posz Law Group, PLC

(57) ABSTRACT

A link connecting a lid and a base member of a filler lid structure includes first and second link members. At an opening position, a distance between a distal end of the lid and the base member is larger than a distance between a proximal end of the lid and the base member. The first link member swings about a first support portion in a direction in which a second support portion is moved away from the base member, when the lid shifts from a closing position to the opening position. A distance between a base support point at which the base member or the first link member supports a third support portion at the closing position and an end support point at which the lid supports a fourth support portion at the closing position changes when the lid shifts from the closing position to the opening position.

3 Claims, 7 Drawing Sheets

(56) References Cited

U.S. PATENT DOCUMENTS

| | | | | |
|---|---|---|---|---|
| 2010/0252565 A1* | 10/2010 | Pipp | .................. | B60K 15/05 |
| | | | | 220/825 |
| 2011/0285166 A1* | 11/2011 | Baba | .................. | E05D 3/145 |
| | | | | 296/97.22 |
| 2015/0375630 A1* | 12/2015 | Jeong | .................. | B60K 15/05 |
| | | | | 49/386 |
| 2016/0087375 A1* | 3/2016 | Yoshizawa | ............... | B60K 1/04 |
| | | | | 439/345 |
| 2017/0292305 A1* | 10/2017 | Geissenhoener | ...... | B62D 25/24 |

* cited by examiner

FILLER LID STRUCTURE

TECHNICAL FIELD

The present invention relates to a filler lid structure for covering a supply port for an energy source, for example, a refueling port of a vehicle or the like.

BACKGROUND ART

Generally, a supply port for an energy source, for example, a refueling port of a vehicle or the like, is covered with a filler lid structure. As a filler lid structure in a vehicle, a filler lid structure including: a base member that has an opening portion communicating with a supply port; and a lid that is mounted directly or indirectly to the base member and shifts between a closing position at which the lid closes the opening portion and an opening position at which the lid opens the opening portion, is known. The base member of the filler lid structure is also referred to as filler box, and the lid of the filler lid structure is also referred to as filler lid.

In the case where the lid uniaxially swings relative to the base member, for example, in the case where the lid is pivotally supported directly on the base member, etc., the trajectory of movement of the lid is large. Thus, in order to prevent the lid from interfering with the base member during opening/closing operation, a relatively large gap is provided between the base member and the lid at the closing position in a general filler lid structure. However, in this case, since the gap is viewed from a user, there is problem in that it is difficult to improve the design of the filler lid structure, further the design of a vehicle equipped with the filler lid structure. In addition, since the trajectory of movement of the lid is large as described above, there is also a problem in that the filler lid structure is bulky.

Therefore, in recent years, a technique to interpose a gooseneck type hinge between the lid and the base member has been proposed (for example, see JP2013-001384 (A)).

According to the technique proposed in JP2013-001384 (A), the hinge swings relative to the base member, and the lid swings together with the hinge relative to the base member. In this case, the swing center of the lid can be located at a position away from the lid by the hinge. Therefore, unlike the lid of the conventional uniaxial swing type filler lid structure described above, the lid of such a filler lid structure draws a relatively compact trajectory of movement. Thus, in such a filler lid structure, the above-described gap between the base member and the lid at the closing position can be reduced. In addition, since the trajectory of movement of the lid is relatively compact, such a filler lid structure is not bulky as compared to the conventional uniaxial swing type filler lid structure described above.

However, for example, as shown in FIG. 2 of JP2013-001384 (A), the gooseneck type hinge is relatively large in size, and the filler box needs a relatively large space for housing the hinge. Vehicles have been equipped with many interior members and exterior members in recent years, so that each member is required to be made compact. Similarly, the filler box is also required to be made compact, and the above-described gooseneck type hinge does not suit such a requirement.

A technique to interpose two link members between the base member and the lid instead of the above-described gooseneck type hinge has also been proposed (for example, see JP2005-34367 (A)).

According to the technique proposed in JP2005-343367 (A), each of the two links is supported so as to be swingable relative to the base member and swim ably supports the lid. Therefore, also in this case, the trajectory of movement of the lid can be made small, so that the above-described gap between the base member and the lid at the closing position can be reduced. In addition, the two links in this case are less bulky than the above-descried one gooseneck type hinge. Thus, the space for housing the hinge or the links in the filler box is thought to be able to be made small, and further the filler box is thought to be able to be made compact as compared to the filler lid structure proposed in JP2013-001384 (A).

However, the requirements of making various members in vehicles compact and reducing the weights of the various members have been increasing in recent years, and a filler lid structure that is made further compact while maintaining excellent design, has been desired.

SUMMARY OF INVENTION

Technical Problem

The present invention has been made in view of the above-described circumstances, and an object of the present invention is to provide a filler lid structure that, is made further compact while maintaining good design.

Solution to Problem

A filler lid structure of the present invention that solves the above-described problem is a filler lid structure including:

a base member having an opening portion communicating with a supply port;

a lid having a distal end as one end and a proximal end as another end and configured to shift between a closing position at which the lid covers the opening portion and an opening position at which the lid opens the opening portion; and a link including a first link member and a second link member and connecting the base member to the lid, wherein the first link member has a first support portion supported on the base member and a second support portion supported on the lid, is swingable relative to the base member about the first support portion, and is swingable relative to the IA d about the second support portion, the second link member has a third support portion supported on the base member or the first link member and a fourth support portion supported on the lid, is swingable relative to the base member or the first link member about the third support portion, and is swingable relative to the lid about the fourth support portion, the second support portion is located at the proximal end side of the lid with respect to the fourth support portion, at the opening position, a distance between the distal end of the lid and the base member is larger than the distance between the proximal end of the lid and the base member, when the lid shifts from the closing position to the opening position, the first link member swings about the first support portion in a direction in which the second support portion is moved away from the base member, and a distance between a base support point at which the base member or the first link member supports the third support portion at the closing position and an end support point at which the lid supports the fourth support portion at the closing position changes when the lid shifts from the closing position to the opening position.

Advantageous Effects of Invention

The lid structure of the present invention is made further compact while maintaining good design.

DESCRIPTION OF EMBODIMENTS

Figure 1:
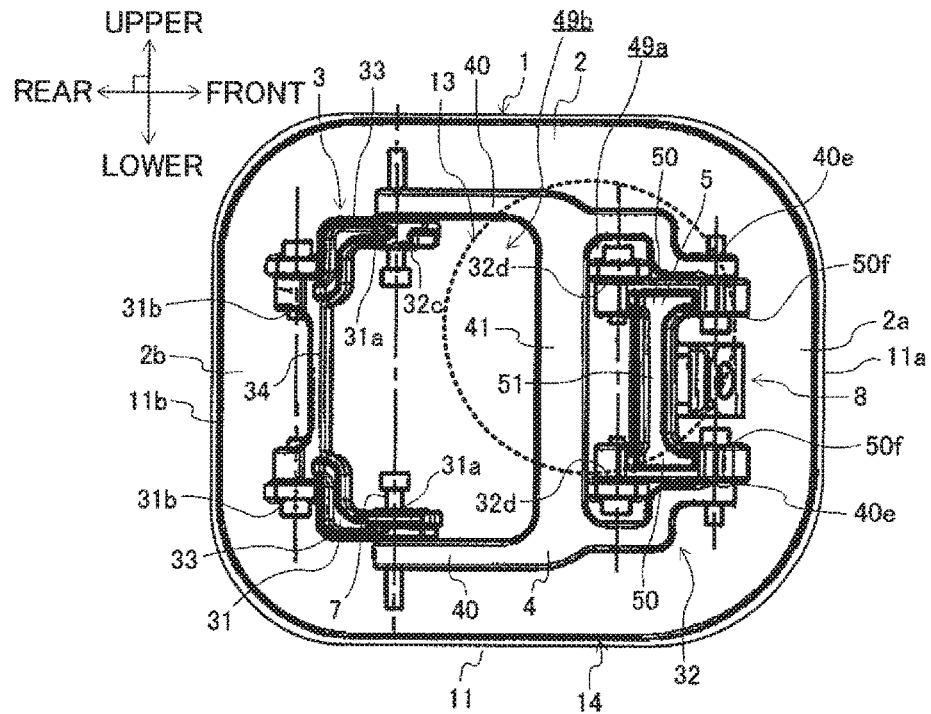
FIG. 1 is an illustrative diagram showing a link in a filler lid structure of Embodiment 1 in a closed state.

The filler lid structure of the present invention is applicable to various use applications including a use application for covering a refueling port of a vehicle. A base member in the filler lid structure of the present invention has an opening portion. Examples of vehicles that are commercially distributed at present include vehicles that each drive an internal combustion engine by using gasoline, light oil, natural gas, hydrogen, or the like as an energy source, vehicles that each drive an electric motor by using electricity as an energy source, and vehicles that each use an internal combustion engine and an electric motor in combination. Hereinafter, for the sake of convenience, a vehicle including an internal combustion engine is referred to as engine vehicle, and a vehicle including an electric motor is referred to as electric vehicle.

The energy source of an engine vehicle is generally referred to as fuel and is stored in a fuel tank. The opening portion of the base member directly or indirectly communicates with a refueling port of the fuel tank, that is, a supply port of the fuel tank, and serves as an inlet for fuel to the fuel tank. In addition, electricity which is the energy source of an electric vehicle can be supplied directly to a battery of the electric vehicle through charging. In this case, the opening portion of the base member directly indirectly communicates with a charging port of the battery, that is, a supply port of the battery, and serves as an outlet for a charging plug. Furthermore, in a fuel cell vehicle, electricity is generated by oxygen and hydrogen reacting with each other in a fuel cell stack, and is stored in a battery. Generally, oxygen to be supplied to the fuel cell stack is introduced from air, and hydrogen is stored in a fuel tank of the vehicle. Therefore, in this case, the opening portion of the base member directly or indirectly communicates with an introduction port of the fuel tank, that is, a supply port of the fuel tank, and serves as an inlet for hydrogen to the fuel tank. As described above, the filler lid structure of the present invention covers the supply port in each of various devices, etc. When a lid of the filler lid structure shifts from a closing position to an opening position, the supply port is exposed through the opening portion of the base member.

The filler lid structure of the present invention may be produced independently of each of various devices having various supply ports described above as examples and be integrated therewith later, or may be produced integrally with each of the various devices. In each case, the filler lid structure of the present invention includes a base member, a lid, and a link.

Hereinafter, the filler lid structure of the present invention is described with specific examples.

Unless mentioned otherwise in particular, a numerical value range of "x to y" described in the present specification includes, in a range thereof, a lower limit "x" and an upper limit "y". A new numerical value range can be formed by arbitrarily combining such upper limit values, lower limit values, and numerical values described in embodiments. In addition, numerical values arbitrarily selected within these numerical value ranges can be used as upper limit and lower limit numerical values.

Embodiment 1

Figure 2:
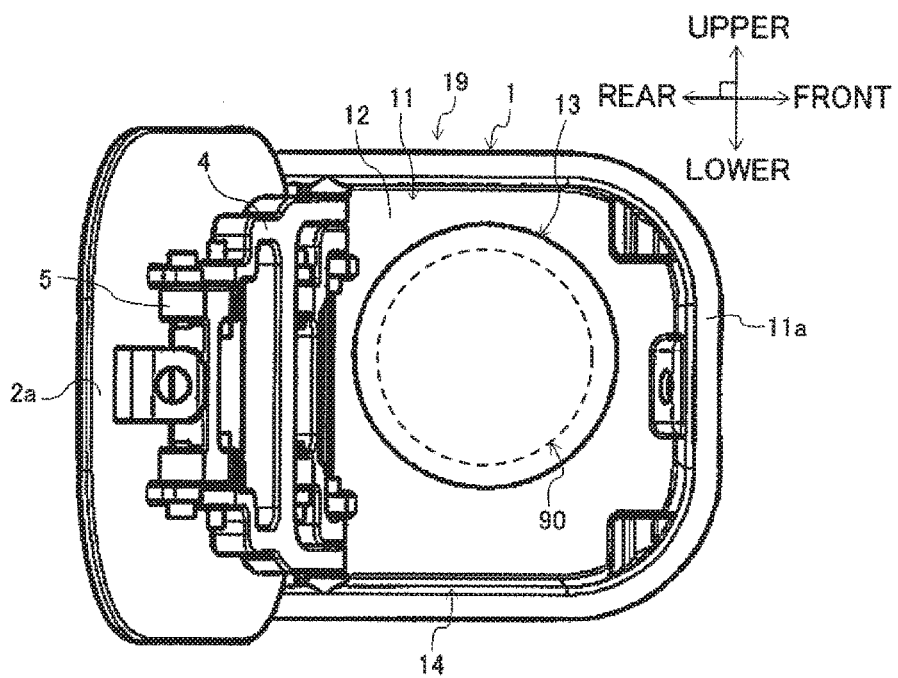
FIG. 2 is an illustrative diagram showing the link in the filler lid structure of Embodiment 1 in an opened state.
Figure 3:
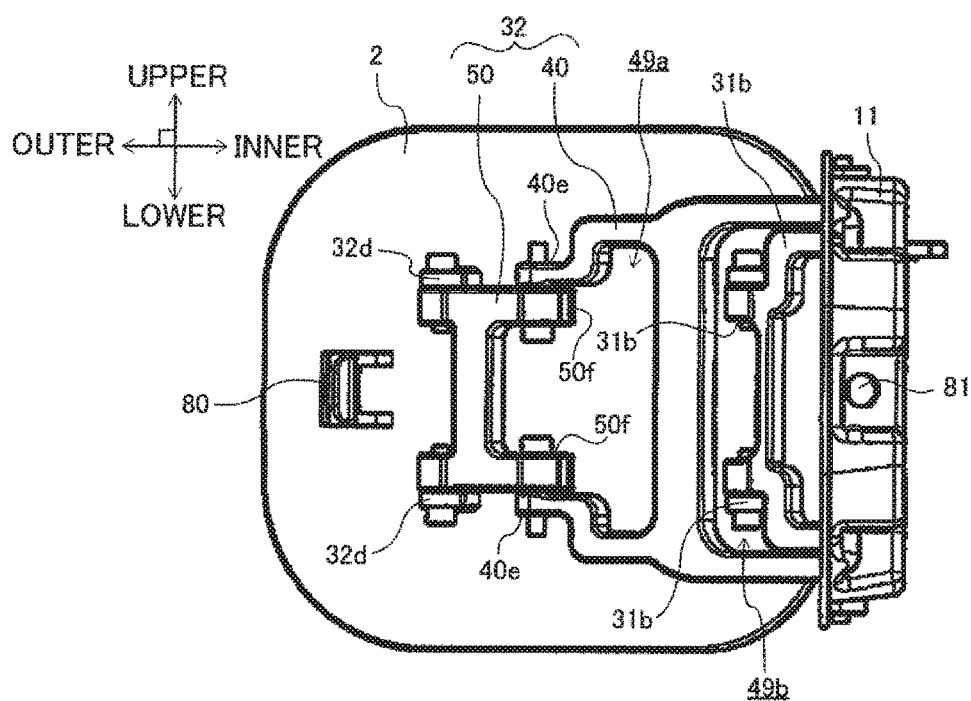
FIG. 3 is an illustrative diagram showing the link in the filler lid structure of Embodiment 1 in the opened state.
Figure 4:
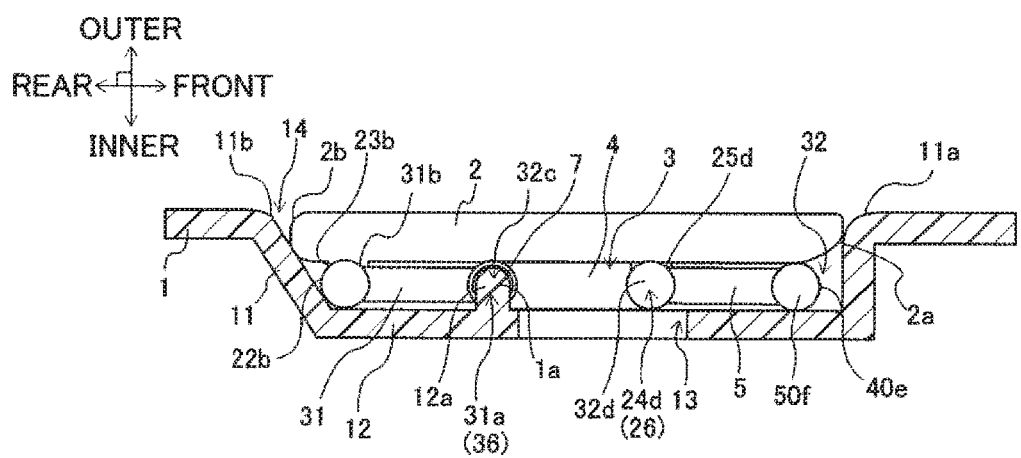
FIG. 4 is an illustrative diagram showing the filler lid structure of Embodiment 1 in the closed state.
Figure 5:
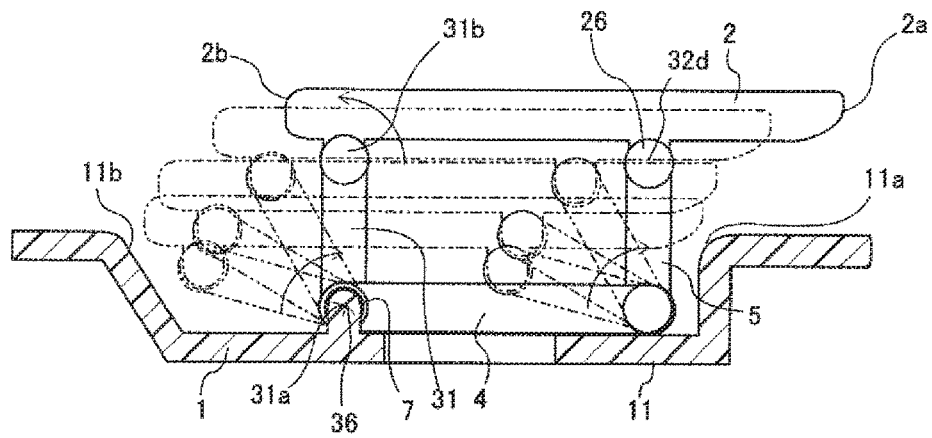
FIG. 5 is an illustrative diagram showing the filler lid structure of Embodiment 1 in a pop-up state.
Figure 6:
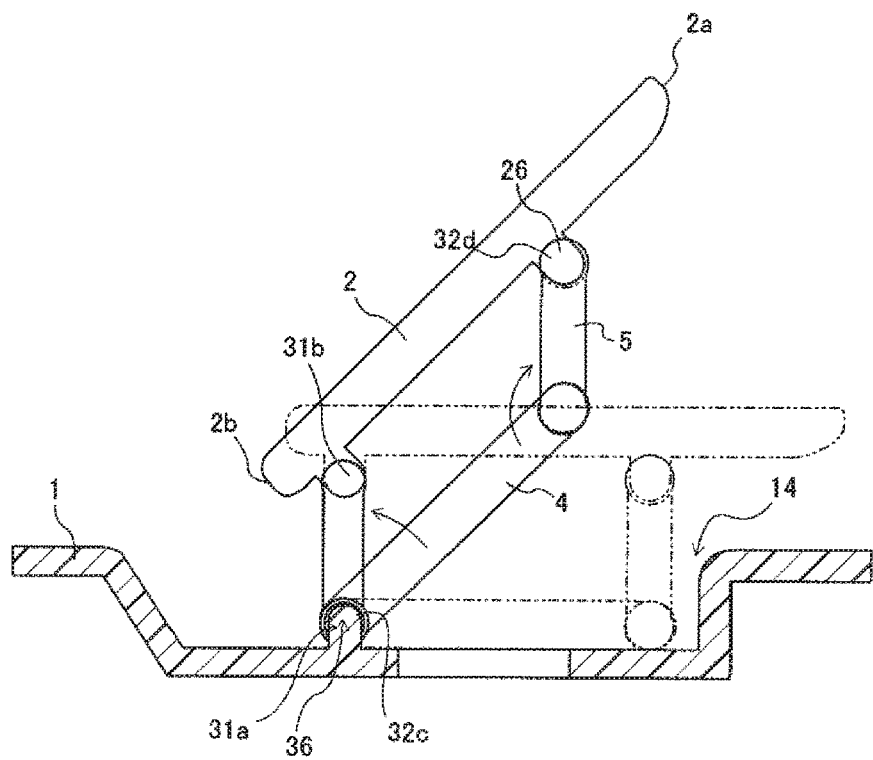
FIG. 6 is an illustrative diagram showing the filler lid structure of Embodiment 1 in a state between the pop-up state and the opened state.
Figure 7:
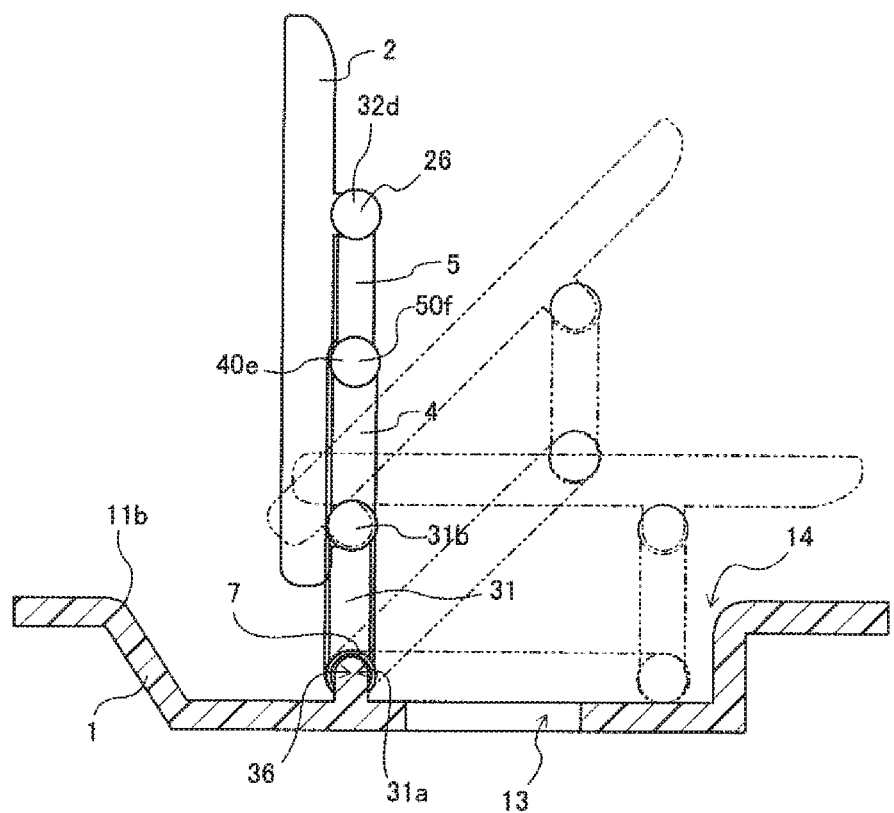
FIG. 7 is an illustrative diagram showing the filler lid structure of Embodiment 1 in the opened state.

A filler lid structure of Embodiment 1 is one type of vehicle exterior member that is disposed on a vehicle and serves to cover a refueling port of the vehicle. FIGS. 1 to 7 are illustrative diagrams schematically showing the filler lid structure of Embodiment 1. Specifically, FIG. 1 shows a state of a link in the filler lid structure of Embodiment 1 in a closed state as viewed from the vehicle outer side. FIG. 2 shows a state of the link in the filler lid structure of Embodiment 1 in an opened state as viewed from the vehicle outer side. FIG. 3 shows a state of the link in the filler lid structure of Embodiment 1 in the opened state as viewed from the front side. FIG. 4 shows a cross-section of the filler lid structure of Embodiment 1 in the closed state, FIG. 5 shows a cross-section of the filler lid structure of Embodiment 1 in a pop-up state, FIG. 6 shows a cross-section of the filler lid structure of Embodiment 1 in a state between the pop-up state and the opened state, and FIG. 7 shows a cross-section of the filler lid structure of Embodiment 1 in the opened state.

The closed state, the opened state, and the pop-up state of the filler lid structure refer to states of the filler lid structure when a lid is at a closing position, at an opening position, and at a pop-up position, respectively. In addition, upper, lower, outer, inner, front, and rear refer to upper, lower, outer, inner, front, and rear in FIGS. 1 to 4, respectively. Furthermore, in FIG. 1, the front-rear direction corresponds to the travelling direction of a vehicle, the outer-inner direction refers to the vehicle exterior-interior direction, and the upper-lower direction refers to the vertical direction.

The filler lid structure of Embodiment 1 includes a base member 1, a lid 2, a link 3, a biasing member 7, and a lock mechanism 8. The biasing member 7 and a portion of the lock mechanism 8 among these components are made of metal. The others of these components are made of resin.

As shown in FIGS. 2 and 4, the base member 1 includes: a general portion 19 that is formed in a substantially plate shape; and a case 11 that is connected to the general portion 19 and is recessed and formed in a box shape. A window portion 13 is provided in a bottom wall 12 of the case 11. The window portion 13 penetrates the bottom wall 12 in a thickness direction thereof. In other words, it can be said that the case 11 is recessed relative to the general portion 19, a top portion 14 of the case 11 is open in the general portion 19, and the window portion 13 is open in the bottom wall 12 of the case 11. Further, in other words, the case 11 in the filler lid structure of Embodiment 1 has an opening portion that is doubly open in the top portion 14 and the window portion 13. That is, it can be said that the top portion 14 and the window portion 13 of the case 11 correspond to an opening portion in the filler lid structure of the present invention, and the filler lid structure of Embodiment 1 has an opening portion having a double structure. The opening portion communicates with a supply port, that is, a refueling port 90 in an engine vehicle.

The lid 2 is formed in a substantially plate shape and covers the top portion 14 of the case 11, that is, one opening portion, at the closing position as shown in FIGS. 1 and 4. Another opening portion, that is, the window portion 13, is also similarly covered with the lid 2 at this time.

As shown in FIGS. 1 and 4, in the filler lid structure of Embodiment 1, the lid 2 at the closing position is fitted into the top portion 14 of the case 11 such that the lid 2 and the general portion 19 are substantially flush with each other. At this time, the top portion 14 of the case 11 and the lid 2 are slightly spaced apart from each other.

More specifically, the case 11 is formed in a substantially box shape, and the lid 2 is formed in a substantially rectangular shape corresponding to the shape of the top portion 14 of the case 11. An end, in a longitudinal direction, of the lid 2 is referred to as distal end 2a of the lid 2, and the other end thereof is referred to as proximal end 2b of the lid 2. Similarly, an end, in the longitudinal direction, of the case 11 is referred to as distal end 11a of the case 11, and the other end thereof is referred to as proximal end 11b of the case 11 in Embodiment 1, the longitudinal direction of each of the lid 2 and the case 11 is directed so as to correspond to the front-rear direction. The distal end 2a and the distal end 11a correspond to end portions, at the front side, of the lid 2 and the case 11, and the proximal end 2b and the proximal end 11b correspond to end portions, at the rear side, of the lid 2 and the case 11. As shown in FIG. 4, at the closing position, the distal end 2a of the lid 2 faces the distal end 11a of the top portion 14 of the case 11, and the proximal end 2b of the lid 2 faces the proximal end 11b of the top portion 14 of the case 11.

As shown in FIG. 1, the link 3 includes a first link member 31 and a second link member 32. The first link member 31 and the second link member 32 are supported by corresponding mating members at the upper side and the lower side of the filler lid structure, respectively. The mating members are described later.

The second link member 32 includes a first movable partial body 4 and a second movable partial body 5. As shown in FIG. 1, the first link member 31 is formed in a substantially C shape that is vertically symmetrical, and each of the first movable partial body 4 and the second movable partial body 5 is formed in a substantially H shape that is vertically symmetrical. More specifically, the first link member 31 includes: a pair of first main links 33 each having a rod shape; and a first connection link 34 that connects ends, in the longitudinal direction, of the pair of first main links 33. The first movable partial body 4 includes: a pair of first main partial bodies 40 each having a rod shape; and a first partial body link 41 that connects substantially center portions, in the longitudinal direction, of the pair of first main partial bodies 40. The second movable partial body 5 includes: a pair of second main partial bodies 50 each having a rod shape; and a second partial body link 51 that connects substantially center portions, in the longitudinal direction, of the pair of second main partial bodies 50.

Each of ends of the respective first main links 33 forms a first support portion 31a, and each of the other ends thereof forms a second support portion 31b. Each of ends, in the longitudinal direction, of the respective first main partial bodies 40 forms a third support portion 32c, and each of the other ends thereof forms a first swing support portion 40e that pivotally supports a second swing support portion 50f of each second main partial body 50. Each of ends, in the longitudinal direction, of the respective second main partial bodies 50 forms a fourth support portion 32d, and each of the other ends thereof forms the second swing support portion 50f, which is pivotally supported by the first swing support portion 40e. It can be said that the first movable partial body 4 and the second movable partial body 5 are swingable relative to each other about the first swing support portions 40e and the second swing support portions 50f, and the second link member 32 is formed in a hinge shape.

In the filler lid structure of Embodiment 1, each of the first support portions 31a, the second support portions 31b, the fourth support portions 32d, and the first swing support portions 40e is a projection. The third support portions 32c have hole shapes.

As shown in FIG. 4, each first support portion 31a of the first link member 31 is supported by a hole-shaped first mating support portion 1a provided to the base member 1. Specifically, a pair of first mating base portions 12a each formed in a substantially plate shape are provided upright on the base member 1 from the bottom wall 12 of the case 11 toward the interior of the case 11. Each first mating base portion 12a is located at a position corresponding to each first support portion 31a, and each hole-shaped first mating support portion 1a is formed in each first mating base portion 12a so as to penetrate therethrough. Each first support portion 31a, which is formed in a projection shape, is pivotally supported by the corresponding hole-shaped first mating support portion 1a. Therefore, each first support portion 31a is supported on the base member 1 by the first mating support portion 1a. In addition, the first link member 31 is relatively swingable relative to the base member 1 about the first support portions 31a, which are pivotally supported by the first mating support portions 1a.

Each second support portion 31b is supported by a hole-shaped second mating support port on 22b provided to the lid 2. Specifically, a pair of second mating base portions 23b each formed in a substantially plate shape are provided upright on a back surface of the lid 2, that is, the surface, at the link 3 side, of the lid 2. Each second mating base portion 23b is located at a position corresponding to each second support portion 31b, and each hole-shaped second mating support portion 22b is formed in each second mating base portion 23b so as to penetrate therethrough. Each second support portion 31b, which is formed in a projection shape, is pivotally supported by the corresponding hole-shaped second mating support portion 22b. Therefore, each second support portion 31b is supported on the lid 2 by the second mating support portion 22b. In addition, the first link member 31 is relatively swingable relative to the lid 2 about the second support portions 31b, which are pivotally supported by the second mating support portions 22b.

As described above, the second link member 32 includes the first movable partial body 4 and the second movable partial body 5. The first movable partial body 4 and the second movable partial body 5 are swingable relative to each other about the first swing support portions 40e and the second swing support portions 50f.

A pair of the third support portions 32c of the first movable partial body 4 are supported on the first link member 31 at the same positions as the first support portions 31a. A pair of the fourth support portions 32d of the second movable partial body 5 are supported by hole-shaped fourth mating support portions 24d provided to the lid 2. Specifically, a pair of fourth mating base portions 25d each formed in a substantially plate shape are provided upright on the back surface of the lid 2. Each fourth mating base portion 25d is located at the distal end 2a side of the lid 2 with respect to the second mating support portion 22b and at a position corresponding to each fourth support portion 32d. Each hole-shaped fourth mating support portion 24d is formed in each fourth mating base portion 25d so as to penetrate therethrough. Each fourth support portion 32d, which is formed in a projection shape, is pivotally supported by the corresponding hole-shaped fourth mating support portion 24d. Therefore, each fourth support portion 32d is supported on the lid 2 by the fourth mating support portion 24d. In addition, the second movable partial body 5 is relatively swingable relative to the lid 2 about the fourth support portions 32d, which are pivotally supported by the fourth mating support portions 24d. The second movable partial body 5 is supported on the lid 2 at the distal end 2a side with respect to the first link member 31, and the first link member 31 is supported on the lid 2 at the proximal end 2b side with respect to the second movable partial body 5 of the second link member 32. The second mating support portions 22b and the fourth mating support portions 24d are greatly spaced apart from, the back surface of the lid 2, and the lid 2 supports the second support portions 31b and the fourth support portions 32d at the further inner side, that is, at the case 11 side, with respect to the back surface thereof.

The biasing member 7 is composed of a torsion coil spring and is mounted to the first support portion 31a. One end of the biasing member 7 is fixed to the bottom wall 12 of the case 11, and the other end of the biasing member 7 is fixed to the first link member 31. The biasing member 7 biases the first link member 31 to swing in the clockwise direction in FIG. 4. In other words, the biasing member 7 biases the first link member 31 toward a pop-up position shown in FIG. 5. Further, in other words, the biasing member 7 biases the first link member 31 in a direction in which the second support portion 31b is moved away from the base member 1.

Furthermore, the filler lid structure of Embodiment 1 includes the lock mechanism 8 for locking the lid 2 at the closing position shown in FIG. 1. As shown in FIGS. 1 and 3, the lock mechanism 8 includes: a lock engagement portion 80 that is disposed on the filler lid 2; a lock shaft 81 that is disposed on the base member 1 and is engageable with the lock engagement portion 80; a lock biasing member that biases the lock shaft 81 toward the lock engagement portion 80 and is not shown; an electric motor that is disposed in the vehicle and is not shown; a connection member that connects the electric motor to the lock shaft 81 and is not shown; and an opening operation portion that is disposed in the interior of the vehicle, is used for driving the electric motor, and is not shown. In the filler lid structure of Embodiment 1, the lock biasing member is composed of a helical spring, and the connection member is composed of a pulley.

The lock mechanism 8 locks the lid 2 at the closing position when a user does not operate the opening operation portion. That is, at this time, the lock shaft 81 is biased toward the lock engagement portion 80 by the lock biasing member, and the lock shaft 81, which is disposed on the base member 1, and the lock engagement portion 80, which is disposed on the lid 2, are engaged with each other, so that the lid 2 is locked at the closing position at which the lid 2 covers the opening portion of the base member 1, that is, the top portion 14 and the window portion 13. In addition, when the user operates the opening operation portion so as to press the opening operation portion, the engagement of the lock shaft 81 and the lock engagement portion 80 is released, so that the lock of the lid 2 is released.

Hereinafter, operation of the filler lid structure of Embodiment 1 is described.

First, when the lid 2 is at the closing position as shown in FIG. 1, that is, when the filler lid structure is in the closed state, the lid 2 is locked at the closing position by the lock mechanism 8. At this time, the first movable partial body 4 of the second link member 32 extends along the bottom wall 12 of the base member 1. The second swing support portions 50f of the second movable partial body 5 are located at the front side, that is, at the distal end 11a side of the case 11, with respect to the fourth support portions 32d. Therefore, the second movable partial body 5 is folded back at an acute angle relative to the first movable partial body 4 about the pivotally supported portions of the first swing support portions 40e and the second swing support portions 50f. That is, at this time, the first movable partial body 4 and the second movable partial body 5 partially overlap each other.

At this time, the first link member 31 and the second movable partial body 5 extend from the front side of the base member 1 (that is, the distal end 11a side of the case 11) toward the rear side thereof (that is, the proximal end 11b side thereof). The first support portions 31a of the first link member 31 are supported by the first mating support portions 1a of the base member 1 and also coaxially support the third support portions 32c of the first movable partial body 4, and the first link member 31 is folded back at an obtuse angle relative to the first movable partial body 4. The lid 2 is located so as to be substantially flush with the general portion 19, covers the window portion 13 and the top portion 14, which are the opening portion, and is locked, that is, restricted in position, by the lock mechanism 8.

When the lid 2 is located at the closing position by the lock mechanism 8 as shown in FIG. 1, if the user operates the opening operation portion (not shown) of the lock mechanism 8, the electric motor rotates by a predetermined amount. Accordingly, the connection member that follows the rotation of the motor pulls the lock shaft 81. The lock shaft 81 pulled by the connection member disengages from the lock engagement portion 80, and the engagement of the lock engagement portion 80 and the lock shaft 81 is released, so that the lock by the lock mechanism 8 is released. Since the lid 2 is biased toward the pop-up position shown in FIG. 5 by the biasing member 7, when the lock by the lock mechanism 8 is released, the lid 2 swings to shift from the closing position shown in FIGS. 1 and 4 to the pop-up position shown in FIG. 5. Specifically, the first link member 31 swings in the clockwise direction in FIG. 4 about the first support portions 31*a*, so that the second support portions 31*b* is moved away from the base member 1. The lid 2 is also moved away from the base member 1 together with the second support portions 31*b*. At this time, since the fourth support portions 32*d*, which are supported on the lid 2, also shift together with the lid 2, the second movable partial body 5 swings relative to the first movable partial body 4 in the clockwise direction in FIG. 4. Therefore, the lid 2 of the filler lid structure is popped up at the outer side as shown in FIG. 5, so that a gap appears between the lid 2 and the base member 1. The angle formed between the first link member 31 and the bottom wall 12 of the case 11 at this time is substantially 90°.

The first link member 31 in Embodiment 1 does not shift from the pop-up state shown in FIG. 5 to the opened state shown in FIG. 7. That is, the first link member 31 and the base member 1 are locked to each other at this time. Specifically, at this time, a first stopper that is provided to the first link member 31 and is not shown is locked to a first stopper receiver that is provided to each first mating base portion 12*a* of the base member 1 and is not shown. By the first stopper and the first stopper receiver being locked to each other, the first link member 31 is held in an erect state shown in FIG. 5.

When the lid 2 shifts to the pop-up position shown in FIG. 5, the second support portions 31*b* are moved away from the base member 1. When the lock of the lid 2 by the lock mechanism 8 is released, the lid 2 becomes swingable about the second support portions 31*b*, but, since the second support portions 31*b* and the base member 1 are very close to each other at the closing position, there is a possibility that the lid 2 and the base member 1 interfere with each other when the lid 2 swings. However, at the pop-up position, since the second support portion 31*b* and the base member 1 are away from each other, the lid 2 smoothly swings without interference between the lid 2 and the base member 1.

In addition, by shifting the lid 2 in advance by the biasing member 7 to the pop-up position at which the lid 2 and the base member 1 do not interfere with each other, an advantage that an erroneous operation of the user is inhibited is also achieved. That is, in the case where the biasing member 7 is not provided, the user needs to once pull up the lid 2 at the closing position to the outer side to shift the lid 2 to the pop-up position and then swing the lid 2 toward the opening position. When the user attempts to swing the lid 2 at the closing position through an erroneous operation, there is a possibility that the lid 2 and the base member 1 interfere with each other as described above. By shifting the lid 2 to the pop-up position by the biasing member 7 in advance, the erroneous operation is inhibited, so that interference between the lid 2 and the base member 1 is inhibited and a smooth opening operation of the lid 2 is achieved.

The lid 2 that has shifted to the pop-up position shown in FIG. 5 is swingable in the clockwise direction in FIG. 5 about the second support portions 31*b* by an operation of the user as described above. In other words, the lid 2 that has shifted to the pop-up position is swingable such that the distance between the distal end 2*a* of the lid 2 and the base member 1 is larger than the distance between the proximal end 2*b* of the lid 2 and the base member 1. At this time, as shown in FIG. 6, the fourth support portions 32*d* of the second movable partial body 5, which are supported on the lid 2, shift together with the lid 2. When the swing angle of the lid 2 increases, the distance between the distal end 2*a* of the lid 2 and the first support portion 31*a* also increases. Accordingly, the distance between each fourth support portion 32*d*, which is supported on the lid 2, and each third support portion 32*c*, which is supported by the first support portion 31*a*, also increases, the second movable partial body 5 swings relative to the first movable partial body 4 in the clockwise direction in FIG. 6, and the angle formed between the second movable partial body 5 and the first movable partial body 4 also increases.

The lid 2 further swings to shift to the opening position shown in FIGS. 2, 3, and 7. At this time, the lid 2 opens the window portion 13 and the top portion 14, which are the opening portion, and the user is allowed to supply fuel to the refueling port 90 through the window portion 13 and the top portion 14.

In the opened state shown in FIGS. 2, 3, and 7, the angle formed between the first movable partial body 4 and the second movable partial body 5 is 180°, and the first movable partial body 4 and the second movable partial body 5 are linearly connected to each other. At this time, as shown in FIG. 3, the first link member 31 enters the first movable partial body 4. More specifically, as shown in FIG. 1, the first movable partial body 4, which is formed in a substantially H shape, has a housing space 49*a* and a housing space 49*b* that are defined by the pair of first main partial bodies 40 and the first partial body link 41. In the closed state shown in FIG. 1, the housing space 49*a* and the housing space 49*b* are arranged in the front-rear direction, and the housing space 49*a* is located at the front side of the housing space 49*b*. In the opened state, the housing space 49*a* and the housing space 49*b* are arranged in the outer-inner direction, and the first link member 31 enters the housing space 49*b*. In addition, the second movable partial body 5 comes out of the housing space 49*a* of the first movable partial body 4.

In the opened state, the first link member 31, the first movable partial body 4, and the second movable partial body 5 are arranged along the back surface of the lid 2. Thus, the link 3 is compact also in the opened state. That is, at this time, the link 3 is retracted from the vicinity of the opening portion, that is, the window portion 13 and the top portion 14, to the rear side, that is, the proximal end 11*b* side of the base member 1, and a sufficient space is ensured near the window portion 13 and the top portion 14. The fore, at this time, the user is allowed to supply fuel to the refueling port 90 without being bothered by the link 3.

After refueling, when the user swings the lid 2 at the opening position to the closing position, the lid 2 is locked at the closing position by the lock mechanism 8 again. Specifically, when the lock is released, the first link member 31 is biased in the clockwise direction in FIG. 7 by the biasing force of the biasing member 7, and is restricted in position by a stopper mechanism that includes the first stopper and the first stopper receiver, which are not shown. In addition, the lock shaft 81 of the lock mechanism 8 is biased by the lock biasing member and projects toward the inner side of the case 11.

When the user swings the lid 2 at the opening position toward the closing position, the lid 2 swings in the clockwise direction in FIG. 7 relative to the first link member 31 about the second support portions 31*b*. The first movable partial body 4 swings in the clockwise direction in FIG. 7 about the third support portions 32*c*. The second movable partial body 5 swings in the counterclockwise direction relative to the first movable partial body 4 about the second swing support portions 50*f*. When the lid 2 shifts to the pop-up position shown in FIG. 5, the first movable partial body 4 comes into contact with the bottom wall 12 of the case 11, and the swing of the first movable partial body 4 stops.

After the lid 2 shifts to the pop-up position shown in FIG. 5, when the user further presses the lid 2 toward the closing position against the biasing force of the biasing member 7, the first link member 31 swings in the counterclockwise direction in FIG. 5 about the first support portions 31a. At this time, the lid 2 swings in the clockwise direction in FIG. 5 relative to the first link member 31 about the second support portions 31b, and the first link member 31 swings in the counterclockwise direction about the first support portions 31a. Therefore, it can be said that, at this time, the lid 2 and the first link member 31 swing relative to each other in a direction in which the lid 2 and the first link member 31 are folded back at an acute angle, in addition, at this time, the second movable partial body 5 swings in the counterclockwise direction relative to the first movable partial body 4 about the second swing support portions 50f.

Meanwhile, as described above, at this time, the lock shaft 81 of the lock mechanism 8 projects toward the interior of the case 11 by the biasing force of the lock biasing member. When the distal end 2a of the lid 2 shifts to a position facing the top portion 14 of the case 11, the distal end 2a of the lid 2 presses the lock shaft 81, so that the lock shaft 81 is once retracted from the interior of the case 11 to the outside of the case 11 against the biasing force of the lock biasing member. However, when the lid 2 shifts to the closing position, the lock engagement portion 80, which is formed in a hole shape, faces the lock shaft 81, the pressing of the lock shaft 81 by the lid 2 is released, and the lock shaft 81 projects toward the interior of the case 11 again to enter the lock engagement portion 80. Therefore, at this time, the lock shaft 81 and the lock engagement portion 80 come into engagement with each other, and the lid 2 is locked at the closing position. Therefore, until the user operates the opening operation portion next, the lid 2 is kept at this lock position.

In the filler lid structure of Embodiment 1, when the lid 2 is shifted from the closing position to the opening position, the lid 2 is located at the pop-up position. At this time, the swing center of the lid 2, that is, the second support portions 31b, are away from the base member 1. Therefore, the lid 2 is swingable without interfering with the base member 1, even though, at the closing position, the distance between the lid 2 and the base member 1, that is, the gap between the lid 2 and the top portion 14 of the case 11 of the base member 1, is small. That is, the filler lid structure of Embodiment 1 does not require a large gap for swing of the lid 2, between the case 11 and the lid 2, and has good design. In addition, by biasing the first link member 31 by the biasing member 7 and further biasing the lid 2 into the pop-up state, an advantage that it is possible to shift the lid 2 to the opening position while inhibiting interference between the lid 2 and the base member 1 by an erroneous operation of the user, is also achieved. The filler lid structure of the present invention includes a filler lid structure that does not include the biasing member 7.

In addition, in the filler lid structure of Embodiment 1, when the lid 2 shifts between the opening position and the closing position, the distance between each fourth support portion 32d, which is supported on the lid 2, and each third support portion 32c, which is supported by the first support portion 31a, changes the filler lid structure of Embodiment 1, points in the lid 2 that support the fourth support portions 32d are the fourth mating support portions 24d not only at the closing position but also at the opening position. The fourth mating support portions 24d are end support points 26 in the filler lid structure of Embodiment 1. In addition, points in the first link member 31 that support the third support portions 32c are the first support portions 31a not only at the closing position but also at the opening position. The first support portions 31a are base support points 36 in the filler lid structure of Embodiment 1. The distance between earn end support point 26 of the lid 2 and each base support point 36 of the first link member 31 decreases from the opened state toward the closed state, and increases from the closed state toward the opened state. That is, when the lid 2 shifts from the opening position to the closing position, the distance between each end support point 26 and each base support point 36 changes. That is, the outer shape of the link 3 changes to an optimum size so as to follow movement of the lid 2. Thus, it can be said that the link 3 in the filler lid structure of Embodiment 1 moves compactly and the entire filler lid structure is also compact.

In addition, in the filler lid structure of Embodiment 1, the distal end 2a side portion and the proximal end 2b side portion of the lid 2 are separately supported by the first link member 31 and the second link member 32, respectively, and the first link member 31 and the second link member 32 are swingable independently of each other. Thus, the trajectory of movement of the lid 2 from the closing position to the opening position (or vice versa) is made compact. Also because of this, the trajectory of movement of the lid 2 is made compact, and further the filler lid structure is made compact.

As described above, in the opened state, the first movable partial body 4 and the first link member 31 overlap each other. In the closed state, the first movable partial body 4 and the second movable part al body 5 overlap each other. Specifically, as shown in FIGS. 1, 4, and 5, in the closed state, the second movable partial body 5 enters the housing space 49a of the first movable partial body 4. The first link member 31 comes out of the housing space 49b of the first movable partial body 4. That is, the first movable partial body 4 overlaps any of the other portions forming the link 3, both in the opened state and in the closed state. Thus, both in the opened state and in the closed state, the rigidity of the link 3 is high. Therefore, for example, as the material of the link 3, it is possible to select a lightweight material having relatively low rigidity, such as resin, instead of a material having relatively high rigidity and a high weight, such as metal. That is, the filler lid structure of Embodiment 1 is made compact and also reduced in weight.

In the filler lid structure of Embodiment 1, although the third support portions 32c of the second link member 32 are supported on the first link member 31, the third support portions 32c may be supported on the base member 1. In this case as well, the second link member 32 is swingable relative to the base member 1 about the third support portions 32c. In the case where the third support portions 32c are supported on the first link member 31, there is an advantage that the second link member 32 is made compact, as compared to the case where the third support portions 32c are supported on the base member 1. In addition, in the case where the third support portions 32c are supported on the first link member 31 at the same positions as the first support portions 31a, the third support portions 32c are allowed to be supported by the first support portions 31a themselves. That is, in this case, it is not necessary to additionally provide third mating support portions that support the third support portions 32c, and it is sufficient to only provide the first mating support portions 1a. Also because of this, the filler lid structure of Embodiment 1 is compact. In addition, in the filler lid structure of Embodiment 1, when the lid 2 is at the closing position, the link 3 is housed within the case 11. That is, the link 3 is not exposed outside the case 11. Because of this, the filler lid structure of Embodiment 1 is compact also in the closed state.

As described above, in the filler lid structure of Embodiment 1, the lid 2 supports the second support portions 31b and the fourth support portions 32d at the further inner side, that is, at the case 11 side, with respect to the back surface thereof. Thus, the first link member 31, the first movable partial body 4, and the second movable partial body 5 are arranged linearly in the closed state as shown in FIG. 4. In addition, the case 11 in the filler lid structure of Embodiment 1 is shallow as shown in FIG. 4, and, in the closed state, the lid 2 is in contact with the first link member the first movable partial body 4, and the second movable partial body 5, and the first link member 31, the first movable partial body 4, and the second movable partial body 5 are in contact with the bottom wall 12 of the case 11. That is, in the filler lid structure of Embodiment 1, the space between the lid 2 and the bottom wall 12 of the case 11 is filled with the link 3. In other words, the back surface of the lid 2 is reinforced by the link 3 and the case 11. Therefore, a space that permits deformation of the lid 2 is not substantially present in the case 11 in the filler lid structure of Embodiment 1, and the lid 2 is reinforced by the link 3 in the closed state as described above. Thus, the lid 2 is unlikely to deform even when being pressed by the user.

The first support portions 31a and the second support portions 31b in the filler lid structure of the present invention may have hole shapes. In this case, the first mating support portions 1a and the second mating support portions 22b that have projection shapes may be pivotally supported by the first support portions 31a and the second support portions 31b, respectively. In this case as well, the first link member 31 is swingable relative to the base member 1 and is swingable relative to the lid 2. The same applies to the third support portions 32c, the fourth support portions 32d, the first swing support portions 40e, and the second swing support portions 50f of the second link member 32.

In the filler lid structure of the present invention, the base member 1 may not include the case 11. For example, the base member 1 may be formed in a plate shape, and the window portion 13, that is, an opening portion 13, may be formed directly in the plate-shaped base member 1. In this case, the base member 1 has the single opening portion 13. In this case, the lid 2 may be fitted into the opening portion 13, or may cover the opening portion 13 at the outer side of the opening portion 13.

The first link member 31 in the filler lid structure of Embodiment 1 does not shift when the filler lid structure changes in state from the pop-up state to the opened state. However, in the filler lid structure of the present invention, the first link member 31 may shift when the filler lid structure changes in state from the pop-up state to the opened state. In this case, some sort of a stopper mechanism that restricts the position of the first link member 31 in the opened state may be provided.

Embodiment 2

Figure 8:
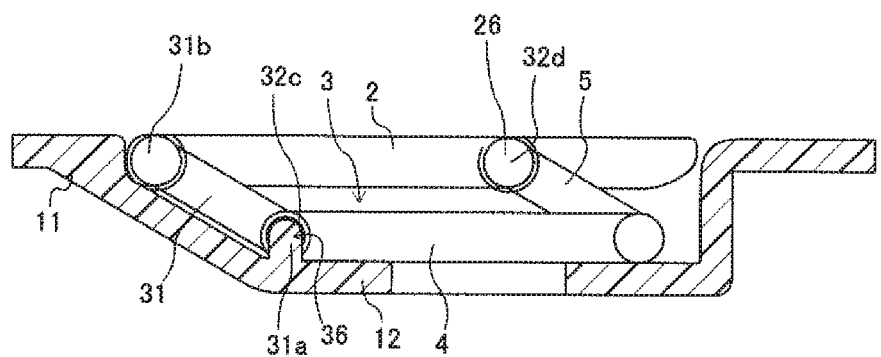
FIG. 8 is an illustrative diagram showing a filler lid structure of Embodiment 2 in a closed state.
Figure 9:
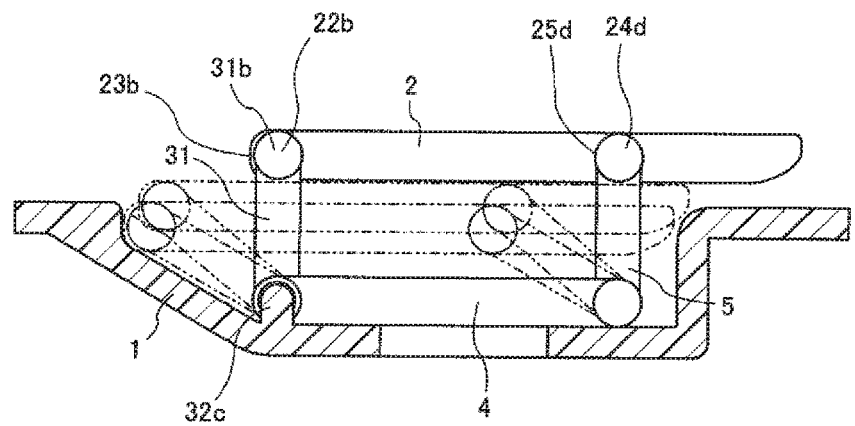
FIG. 9 is an illustrative diagram showing the filler lid structure of Embodiment 2 in a pop-up state.
Figure 10:
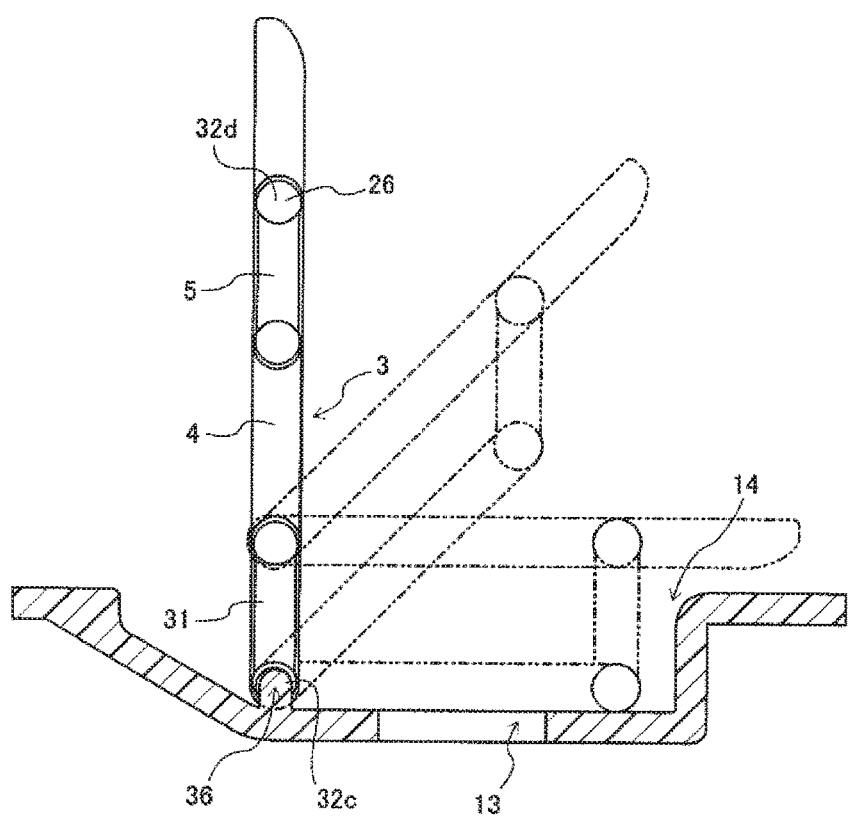
FIG. 10 is an illustrative diagram showing the filler lid structure of Embodiment 2 in an opened state.

A filler lid structure of Embodiment 2 is substantially the same as in Embodiment 1, except for the thickness of the case 11 and the supported position of the link 3 with respect to the lid 2. FIGS. 8 to 10 are illustrative diagrams schematically showing the filler lid structure of Embodiment 2. Specifically, FIG. 8 shows a cross-section of the filler lid structure of Embodiment 2 in a closed state, FIG. 9 shows a cross-section of the filler lid structure of Embodiment 2 in a pop-up state, and FIG. 10 shows a cross-section of the filler lid structure of Embodiment 2 in an opened state.

As shown in FIG. 9, in the filler lid structure of Embodiment 2, the projection heights of the second mating base portions 23b and the fourth mating base portions 25d that are provided on the back surface of the lid 2 are lower than the projection heights of the second mating base portions 23b and the fourth mating base portions 25d in the filler lid structure of Embodiment 1. The second mating support portions 22b and the fourth mating support portions 24d are closer to the back surface of the lid 2 than in Embodiment 1. In the filler lid structure of Embodiment 2, the back surface of the lid 2 is formed in a concave shape, and the lid 2 supports the second support portions 31b and the fourth support portions 32d at slightly more outward positions in the case 11 than in Embodiment 1.

Thus, as shown in FIG. 8, in the closed state, the first link member 31, the first movable partial body 4, and the second movable partial body 5 are not arranged linearly. In addition, as shown in FIG. 8, the case 11 in the filler lid structure of Embodiment 2 is deeper than in Embodiment 1, and, in the closed state, the lid 2 is not in contact with the first movable partial body 4, and the first link member 31 and the second movable partial body 5 are not in contact, with the bottom wall 12 of the case 11. That is, in the filler lid structure of Embodiment 2, a slight gap is present between the lid 2 and the bottom wall 12 of the case 11.

However, in the filler lid structure of Embodiment 2, in the closed state, the link 3 occupies a large part of the interior of the case 11. Thus, the empty region of the case 11 in the closed state is small. For example, when the user touches the lid 2 with their hand and large pressing force acts on the lid 2 toward the case 11, if the empty region of the case 11 is large, the lid 2 is deformable toward the bottom wall 12 of the case 11 by an amount corresponding to the empty region. However, in the case 11 in the filler lid structure of Embodiment 2, a space that permits deformation of the lid 2 is small, and thus deformation of the lid 2 is inhibited. Therefore, the lid 2 is reinforced by the link 3 in the closed state, and is unlikely to deform even when being pressed by the user.

As shown in FIG. 8, in the closed state, a part of the second movable partial body 5 enters the housing space 49a of the first movable partial body 4. In addition, as shown in FIG. 10, in the opened state, the first link member 31 enters the housing space 49b of the first movable partial body 4. Therefore, also in the filler lid structure of Embodiment 2, the first movable partial body 4 overlaps any of the other portions forming the link 3, both in the opened state and in the closed state. Thus, the rigidity of the link 3 in the filler lid structure of Embodiment 2 is also high both in the opened state and in the closed state.

The other structure in the filler lid structure of Embodiment 2 is the same as in the filler lid structure of Embodiment 1. Therefore, the lid 2 is able to shift from a closing position shown in FIG. 8 to a pop-up position shown in FIG. 9, and shift toward an opening position in a state where the second support portions 31b are away from the base member 1. Thus, also in the filler lid structure of Embodiment 2, interference between the lid 2 and the base member 1 is inhibited when the lid 2 is shifted from the closing position toward the opening position. Therefore, the gap between the base member 1 and the lid 2 at the closing position is reduced, and good design is provided to the filler lid structure.

In addition, the distance between each third support portion 32c and each fourth support portion 32d, that is, the distance between each end support point 26 and each base support point 36, in the closed state shown in FIG. 8 decreases when the lid 2 shifts from the opening position to the closing position, and increases when the lid 2 shifts from the closing position to the opening position, similarly to Embodiment 1. That is, also in the filler lid structure of Embodiment 2, the distance between each end support point 26 and each base support point 36 changes when the lid 2 shifts from the opening position to the closing position. Thus, the link 3 moves compactly. Therefore, the filler lid structure of Embodiment 2 is compact similarly to the filler lid structure of Embodiment 1.

Furthermore, in the opened state shown in FIG. 10, the first link member 31, the first movable partial body 4, and the second movable partial body 5 in the filler lid structure of Embodiment 2 are arranged linearly, and the link 3 is retracted at a position away from the opening portion, that is, the window portion 13 and the top portion 14, so that a sufficient space is ensured near the window portion 13 and the top portion 14. Therefore, the link 3 in the filler lid structure of Embodiment 2 does not interfere with the refueling port, similarly to the link 3 in the filler lid structure of Embodiment 1.

Embodiment 3

Figure 11:
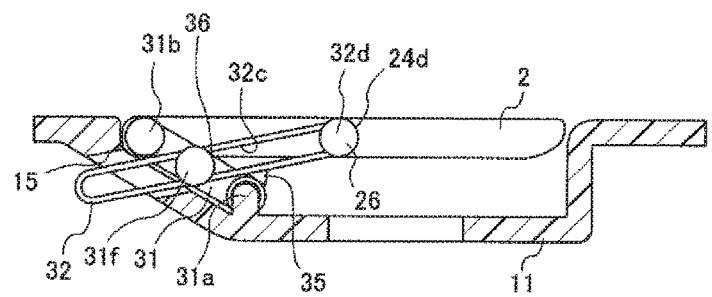
FIG. 11 is an illustrative diagram showing a filler lid structure of Embodiment 3 in a closed state.
Figure 12:
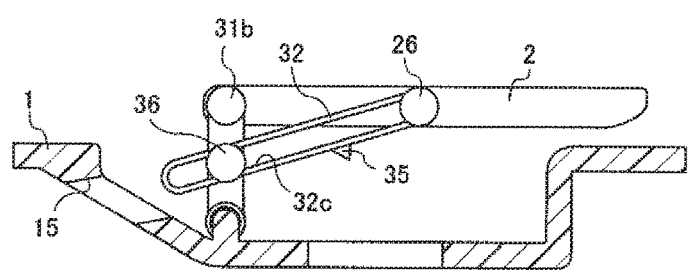
FIG. 12 is an illustrative diagram showing the filler lid structure of Embodiment 3 in a pop-up state.
Figure 13:
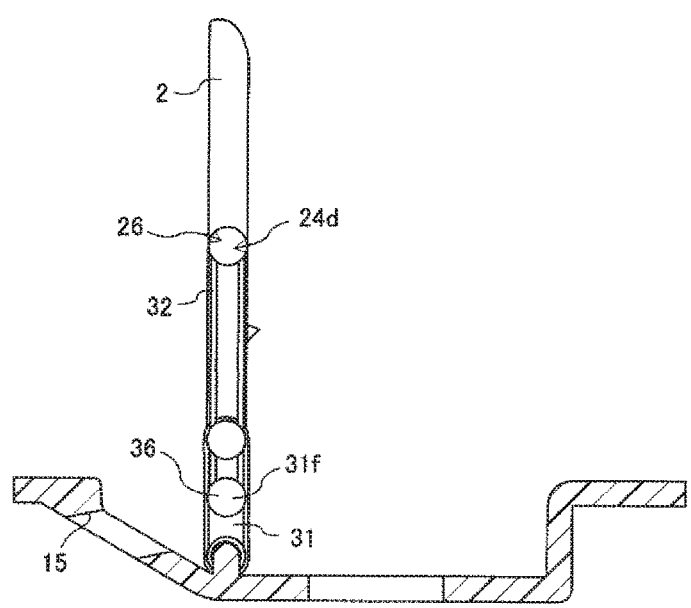
FIG. 13 is an illustrative diagram showing the filler lid structure of Embodiment 3 in an opened state.

A filler lid structure of Embodiment 3 is substantially the same as in Embodiment 1, except for the structure of the link 3. FIGS. 11 to 13 are illustrative diagrams schematically showing the filler lid structure of Embodiment 3. Specifically, FIG. 11 shows a cross-section of the filler lid structure of Embodiment 3 in a closed state, FIG. 12 shows a cross-section of the filler lid structure of Embodiment 3 in a pop-up state, and FIG. 13 shows a cross-section of the filler lid structure of Embodiment 3 in an opened state.

As shown in FIG. 11, the second link member 32 in the filler lid structure of Embodiment 3 is composed of one member formed in a rod shape. An end, in the longitudinal direction, of the second link member 32 forms a fourth support portion 32d that is supported on the lid 2. The third support portion 32c of the second link member 32 is formed in a long hole shape extending in the longitudinal direction of the second link member 32. Meanwhile, a projection 31f is provided to the first link member 31 and between the first support portion 31a and the second support portion 31b. The projection 31f is inserted into the long-hole-shaped third support portion 32c and is able to shift within the third support portion 32c. In the filler lid structure of Embodiment 3, the projection 31f is the base support point 36 in the first link member 31 for the third support portion 32c. The end support point 26 in the lid 2 for the fourth support portion 32d is the fourth mating support portion 24d similarly to the lid structures of Embodiment 1 and Embodiment 2.

Also in the filler lid structure of Embodiment 3, the lid 2 shifts from a closing position shown in FIG. 11 to a pop-up position shown in FIG. 12. That is, the lid 2 is able to shift toward an opening position in a state where the second support portion 31b is away from the base member 1. Thus, also in the filler lid structure of Embodiment 3, the lid 2 and the base member 1 are unlikely to interfere with each other when the lid 2 is shifted from the closing position toward the opening position. In addition, the gap between the base member 1 and the lid 2 at the closing position is small, and thus good design is provided to the filler lid structure.

As shown in FIGS. 11 and 13, the distance between the fourth mating support portion 24d and the projection 31f at the opening position is larger than the distance between the fourth mating support portion 24d and the projection 31f at the closing position. That is, also in the filler lid structure of Embodiment 3, the distance between the end support point 26 and the base support point 36 changes when the lid 2 shifts from the opening position to the closing position. Therefore, the filler lid structure of Embodiment 3 is also compact. An egress/ingress window portion 15 through which the second link member 32 comes in and out is provided in the case 11 of the base member 1. In the closed state, a part of the second link member 32 is retracted to the outside of the case 11 through the egress/ingress window portion 15.

As shown in FIG. 11, a stopper 35 that is locked to the first link member 31 in the closed state is provided to the second link member 32. That is, shift of the first link member 31 and the second link member 32 is restricted in the closed state. Therefore, even when the lid 2 at the closing position is pressed to the case 11 side, the lid 2 is blocked by the first link member 31 and the second link member 32 and is unlikely to shift. In other words, the lid 2 at the closing position is reinforced by the first link member 31 and the second link member 32 and thus is unlikely to deform. Therefore, also in the filler lid structure of Embodiment 3, deformation of the lid 2 at the closing position is inhibited.

In the filler lid structure of Embodiment 3, although the projection 31f, which is supported by the long-hole-shaped third support portion 32c, is provided to the first link member 31, the projection 31f may be provided to the base member 1 as necessary. In the case where the projection 31f is provided to the first link member 31, movement, of the link 3 is compact as compared to the case where the projection 31f is provided to the base member 1. The projection 31f is provided between the first support portion 31a and the second support portion 31b, but may be provided at the same position as the first support portion 31a. In other words, the projection-shaped first support portion 31a may serve as the projection 31f corresponding to the long-hole-shaped third support portion 32c. In this case, the first link member 31 is compact as compared to the case where the projection 31f other than the first support portion 31a is provided. In addition, in the case where the projection 31f is provided between the first support portion 31a and the second support portion 31b, the length, in the longitudinal direction, of the second link member 32 is shortened, and thus the second link member 32 becomes compact.

Embodiment 4

Figure 14:
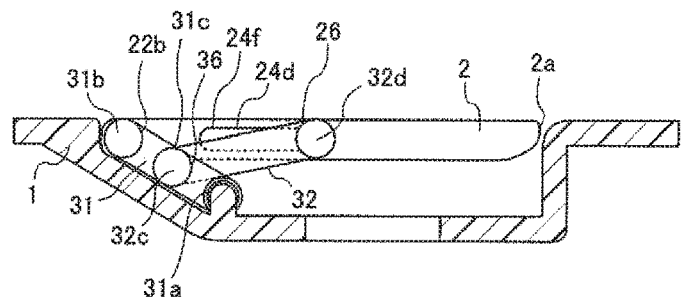
FIG. 14 is an illustrative diagram showing a filler lid structure of Embodiment 4 in a closed state.
Figure 15:
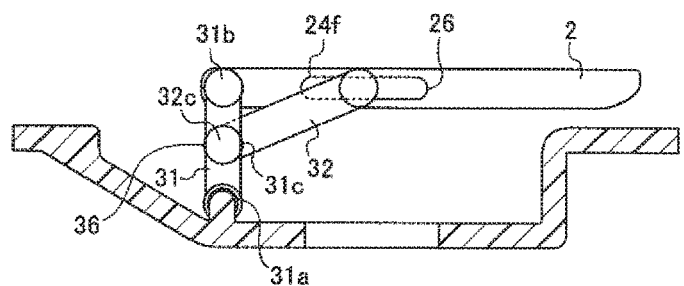
FIG. 15 is an illustrative diagram showing the filler lid structure of Embodiment 4 in a pop-up state.
Figure 16:
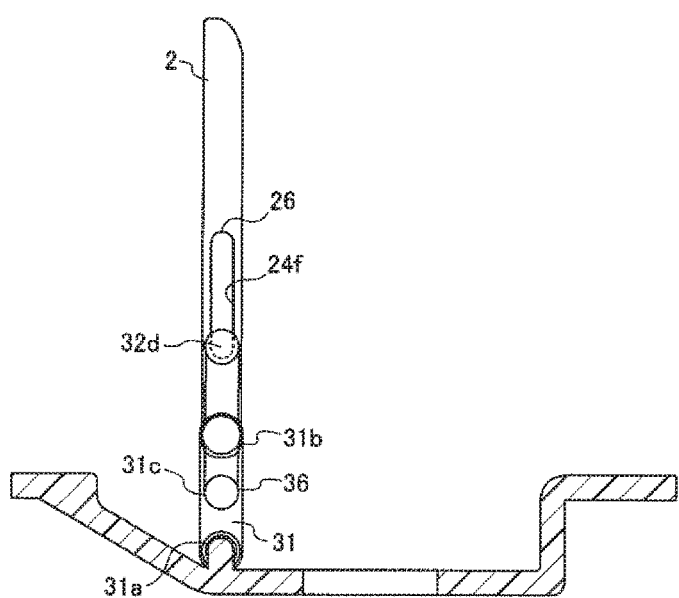
FIG. 16 is an illustrative diagram showing the filler lid structure of Embodiment 4 in an opened state.

A filler lid structure of Embodiment 4 is substantially the same as in Embodiment 1, except for the structures of the lid 2 and the link 3. FIGS. 14 to 16 are illustrative diagrams schematically showing the filler lid structure of Embodiment 4. Specifically, FIG. 14 shows a cross-section of the filler lid structure of Embodiment 4 in a closed state, FIG. 15 shows a cross-section of the filler lid structure of Embodiment 4 in a pop-up state, and FIG. 16 shows a cross-section of the filler lid structure of Embodiment 4 in an opened state.

As shown in FIG. 14, the second link member 32 in the filler lid structure of Embodiment 4 is composed of one member formed in a rod shape, similarly to the filler lid structure of Embodiment 3. A third mating support portion 31c that supports the third support portion 32c is provided to the first link member 31 and between the first support portion 31a and the second support portion 31b. Therefore, the third support portion 32c provided at an end, in the longitudinal direction, of the second link member 32 is supported by the third mating support portion 31c of the first link member 31. A projection-shaped fourth support portion 32d is provided at the other end, in the longitudinal direction, of the second link member 32. The lid 2 has a long hole 24f at the front side, that is, at the distal end 2a side, with respect to the second mating support portions 22b. The long hole 24f corresponds to the fourth mating support portion 24d. The fourth support portion 32d is supported by the long hole 24f. The projection-shaped fourth support portion 32d is able to shift within the long hole 24f, that is, the fourth mating support portion 24d.

As described above, in the filler lid structure of Embodiment 4, the fourth support portion 32d is supported by the long hole 24f while shifting within the long hole 24f. When the lid 2 is at a closing position as shown in FIG. 14, the fourth support portion 32d is supported by an end portion, at the distal end 2a side, of the long hole 24f. Therefore, this portion is the end support point 26. The base support point 36 in the first link member 31 for the third support portion 32c is the above-described third mating support portion 31c.

Also in the filler lid structure of Embodiment 4, the lid 2 shifts from the closing position shown in FIG. 14 to a pop-up position shown in FIG. 15. That is, also in the filler lid structure of Embodiment 4, the lid 2 is able to shift toward an opening position in a state where the second support portion 31b is away from the base member 1. Thus, also in the filler lid structure of Embodiment 4, interference between the lid 2 and the base member 1 is inhibited when the lid 2 is shifted from the closing position toward the opening position. Thus, the gap between the base member 1 and the lid 2 at the closing position is reduced, and good design is provided to the filler lid structure.

As shown in FIGS. 14 and 16, the distance between the end support point 26 and the base support point 36 is at its minimum when the lid 2 is at the closing position, and increases as the lid 2 shifts from the closing position to the opening position. That is, also in the filler lid structure of Embodiment 4, the distance between the end support point 26 and the base support point 36 changes when the lid 2 shifts from the opening position to the closing position. Thus, it can be said that the link 3 in the filler lid structure of Embodiment 4 also moves compactly and the filler lid structure of Embodiment 4 is also compact.

Others

The present invention is not limited to only the embodiments described above and shown in the drawings, and can be implemented with appropriate changes made within a scope not departing from the gist of the present invention. In addition, components shown in the embodiments may be extracted and freely combined to be implemented.

INDUSTRIAL APPLICABILITY

The filler lid structure of the present invention is usable in, for example, a use application for covering a refueling port in an engine vehicle and a use application for covering a charging port in an electric vehicle. In addition, the application of the filler lid structure of the present invention is not limited to application for vehicles, and the filler lid structure of the present invention is also usable in a use application for covering a supply port for an energy source in each of various means of transport, apparatuses, and facilities such as ships, airplanes, and buildings.

The filler lid structure of the present invention can be expressed as described below.

(1) A filler lid structure including:
a base member 1 having an opening portion 13, 14 communicating with a supply port;
a lid 2 having a distal end 2a as one end and a proximal end 2b as another end and configured to shift between a closing position at which the lid 2 covers the opening portion 13, 14 and an opening position at which the lid 2 opens the opening portion 13, 14; and
a link 3 including a first link member 31 and a second link member 32 and connecting the base member 1 to the lid 2, wherein the first link member 31 has a first support portion 31a supported on the base member 1 and a second support portion 31b supported on the lid 2, is swingable relative to the base member 1 about the first support portion 31a, and is swingable relative to the lid 2 about the second support portion 31b, the second link member 32 has a third support portion 32c supported on the base member 1 or the first link member 31 and a fourth support portion 32d supported on the lid 2, is swingable relative to the base member 1 or the first link member 31 about the third support portion 32c, and is swingable relative to the lid 2 about the fourth support portion 32d, the second support portion 31b is located at the proximal end 2b side of the lid 2 with respect to the fourth support portion 32d, at the opening position, a distance between the distal end 2a of the lid 2 and the base member 1 is larger than the distance between the proximal end 2b of the lid 2 and the base member 1, when the lid 2 shifts from the closing position to the opening position, the first link member 31 swings about the first support portion 31a in a direction in which the second support portion 31b is moved away from the base member 1, and a distance between a base support point 36 at which the base member 1 or the first ink member 31 supports the third support portion 32c at the closing position and an end support point 26 at which the lid 2 supports the fourth support portion 32d at the closing position changes when the lid 2 shifts from the closing position to the opening position.

(2) The filler d structure according to (1), further including a biasing member 7 configured to bias the first link member 31 to swing about the first support portion 31a in the direction in which the second support portion 31b is moved away from the base member 1.

(3) The filler lid structure according to (1) or (2), wherein the second link member 32 includes a first movable partial body 4 having the third support portion 32c and a second movable partial body 5 having the fourth support portion 32d and supported so as to be swingable relative to the first movable partial body 4.

(4) The filler lid structure according to (1) or (2), wherein the second link member 32 has the third support portion 32c having a long hole shape,
the first link member 31 or the base member 1 has a projection 31f, and
the projection 31f is able to shift within the third support portion 32c.

(5) The filler lid structure according to (1) or (2), wherein the second link member 32 has the fourth support portion 32d having a projection shape,
the lid 2 has a long hole 21f, and
the fourth support portion 32d is able to shift within the long hole 24f.

(6) The filler lid structure according to any one of (1) to (5), wherein the third support portion 32*c* or the projection 31*f* corresponding to the third support portion 32*c* having a long hole shape, and the first support portion 31*a* are located at the same position.

The invention claimed is:

1. A filler lid structure comprising:
    a base member having an opening portion communicating with a supply port;
    a lid having a distal end as one end and a proximal end opposite to the distal end as another end and configured to shift between a closing position at which the lid covers the opening portion and an opening position at which the lid opens the opening portion; and
    a link including a first link member and a second link member and connecting the base member to the lid, wherein
    the first link member has a first support portion supported on the base member and a second support portion supported on the lid, is swingable relative to the base member about the first support portion, and is swingable relative to the lid about the second support portion, the distal end of the lid being distal to the second support portion and the proximal end of the lid being closer than the distal end to the second support portion,
    the second link member has a third support portion supported on the base member and a fourth support portion supported on the lid, is swingable relative to the base member about the third support portion, and is swingable relative to the lid about the fourth support portion,
    the second support portion is located at the proximal end side of the lid with respect to the fourth support portion,
    the third support portion and the first support portion are located at the same position,
    at the opening position, a distance in an outer-inner direction between the distal end of the lid and the base member is larger than a distance in the outer-inner direction between the proximal end of the lid and the base member,
    when the lid shifts from the closing position to the opening position, the first link member swings about the first support portion in a direction in which the second support portion is moved away from the base member, and
    a distance between a base support point at which the base member supports the third support portion and an end support point at which the lid supports the fourth support portion changes when the lid shifts from the closing position to the opening position.

2. The filler lid structure according to claim 1, further comprising a biasing member configured to bias the first link member to swing about the first support portion in the direction in which the second support portion is moved away from the base member.

3. The filler lid structure according to claim 1, wherein the second link member includes a first movable partial body having the third support portion and a second movable partial body having the fourth support portion and supported so as to be swingable relative to the first movable partial body.

* * * * *